Feb. 8, 1949.  J. H. BEARD  2,461,255
ANIMAL POKE
Filed June 13, 1945
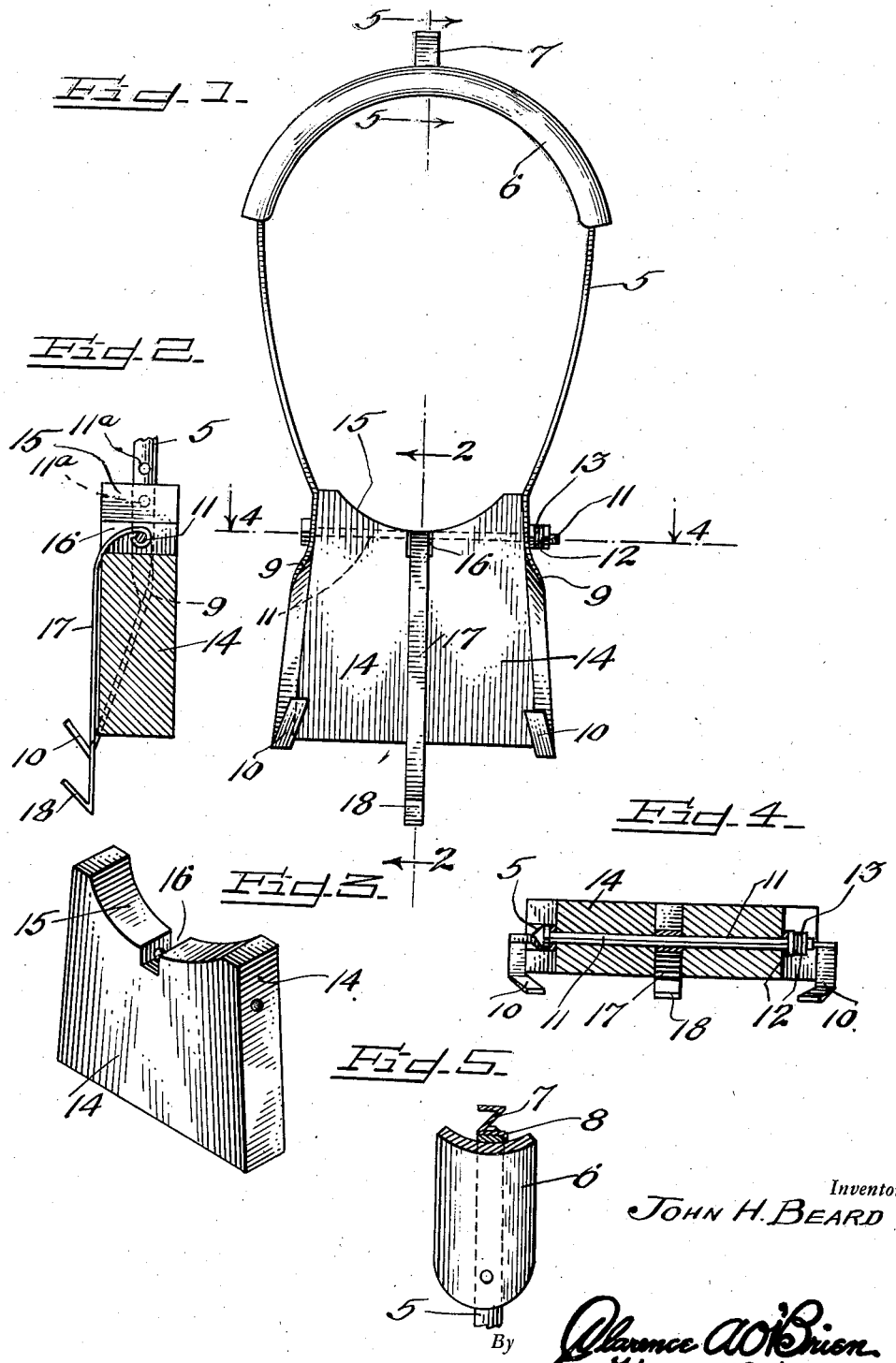
Inventor
JOHN H. BEARD
By Clarence A. O'Brien
and Harvey B. Jacobson
Attorneys Patented Feb. 8, 1949

2,461,255

UNITED STATES PATENT OFFICE 2,461,255

ANIMAL POKE

John H. Beard, Ruston, La.

Application June 13, 1945, Serial No. 599,199

2 Claims. (Cl. 119—140)

This invention relates to new and useful improvements in pokes for animals, and particularly that type of poke embodying hook members adapted to engage the wires of a fence to prevent the animal from passing between or crawling under said wires.

The primary object of the present invention is to provide an animal poke of the above kind which is highly efficient in use and which is of comparatively simple and durable construction.

Another object of the invention is to provide an animal poke including a strap metal yoke of substantially inverted U-shape and adapted to pass about the neck of the animal, the lower ends of the legs of the yoke being bent to form forwardly facing hooks to engage the fence wires.

A further object of the invention is to provide a poke of the above character including a blocklike plate pivotally suspended between the lower end portions of the legs of the yoke for forward or rearward swinging movement about a transverse horizontal axis, whereby to accommodate various positions which the animal may assume and to maintain the yoke in a substantially upright position.

A still further object of the invention is to provide a poke of the above character in which a pivot bolt connects the legs of the yoke and has the plate pivotally suspended therefrom, in combination with a central hook member pivotally suspended from the pivot belt of the plate and extending downwardly in front of and below the latter, as well as below the hook members on the ends of the legs of the yoke so as to effectively engage the fence wires even though they may occur lower than the hook members on the ends of the yoke legs.

Other objects and features of the invention will become apparent from the following description when considered in connection with the accompanying drawing.

In the drawings:

Figure 1 is a front elevational view of an animal poke constructed in accordance with the present invention.

Figure 2 is a fragmentary central vertical section taken substantially on line 2—2 of Figure 1.

Figure 3 is a perspective view of the pivoted plate.

Figure 4 is a horizontal section taken on line 4—4 of Figure 1.

Figure 5 is a fragmentary vertical section taken on line 5—5 of Figure 1.

Referring in detail to the drawing, the present animal poke consists of a strap metal yoke 5 on inverted substantially U-shape so that its upper portion substantially conforms to the contour of the animal's neck about which the yoke is placed. As arcuate neck pad member 6 snugly contacts and is riveted or otherwise secured to the underside of the central portion of the yoke, and this neck pad member is of rounded or curved cross-section as shown in Figure 5 so that the animal will not be injured by sharp corners or angles coming in contact with his neck. Riveted or otherwise secured upon the yoke member 5 intermediate the ends of the pad member 6 is a Z-shaped sheet metal member 7 whose upper flange or end portion projects forwardly to form an upper fence wire engaging hook for the poke. The free end of the lower flange of the member 7 is directed downwardly at 8 to engage the rear edge of the yoke 5 so as to prevent turning of the member 7 about the axis of the rivet which secures it to the yoke 5.

The lower end portions of the legs of yoke 5 are twisted at right angles as at 9 and extend downwardly in parallel relation, the lower terminal portions thereof being bent forwardly and upwardly and declined laterally toward each other to provide hook members 10 for engaging fence wires. As shown in Figure 2, the lower end portions of the legs of yoke 5 are preferably inclined forwardly. A horizontal elongated bolt 11 extends through alined openings 11a in and connects the legs of the yoke 5 immediately above the points where they are twisted at 9, the bolt being removably held in place by means of nuts 12 threaded on one end thereof and having a lock washer 13 interposed therebetween. Pivotally suspended upon the bolt 11 between the lower end portions of the legs of yoke 5 is a relatively thick or block-like plate 14 having a concave recess 15 and its upper edge to conform with the underneath portion of the animal's neck. The plate 14 is relatively heavy and acts to maintain the yoke 5 in a substantially vertical position. It also is allowed to swing freely either forwardly or rearwardly on the bolt 11 to permit freedom of movement of the animal and to accommodate the various positions which the animal may assume. When the plate 14 is in its normal vertical position as shown in Figure 2, the hook members 10 project below and forwardly of the plate 14. Midway between the sides of the plate 14, the latter is provided with a transverse groove 16 within which the adjacent intermediate portion of the bolt 11 is exposed. The upper end of a hook member 17 is rolled loosely about this exposed portion of bolt 11 so as to be pivotally suspended from the latter, said hook member 17 extending forwardly and downwardly in front of the plate 14 and terminating below the latter in a forwardly and upwardly extending hook 18. Thus, the hook 18 is disposed below the hooks 10 of the yoke.

The poke may be applied to the animal's neck by removing the nuts 12 and washer 13 so that the adjacent leg of the yoke may be disengaged from the bolt 11 and flexed laterally away from the plate 14. The yoke is then placed about the animal's neck and the leg of the yoke referred to is again engaged with the bolt 11 and secured thereon by replacement of the nuts 12 and washer 13. In use, one or more of the hooks 10 and 18 and that afforded by the member 7 will engage a wire or wires of the fence should the animal attempt to pass between or under said wires. The animal is thus effectively prevented from passing through the fence without actual contact of the animal's body or legs with the fence wire. Ultimately, the animal will be discouraged from attempting to pass through the fence by reason of having had such attempts repeatedly foiled by the yoke. In practice, the yoke will of course be made of comparatively thick and stiff strap metal which will effectively resist bending strains under ordinary conditions of use, and this is also true with respect to the hook member 17. A series of the openings 11a is provided in each leg of yoke 5 for selective reception of bolt 11, so that the yoke may be adjusted to the size of the animal's neck. Also, the plate 14 tapers smaller in width upwardly so that the legs of yoke 5 may be drawn comparatively closer to each other at the top of said plate to best conform to the animal's neck. This also provides for disposition of the portions of the legs of the yoke below the bolt 11 in downwardly diverging relation. The hooks 10 are inclined toward each other to minimize the chances of the animal getting his hind legs caught by said hooks when scratching his head or ears. The device is comparatively simple and durable, and it may be readily and economically manufactured, as well as easily placed in use. Minor changes may be made and details of construction illustrated and described, such as fall within the scope of the invention as claimed.

I claim:

1. An animal poke comprising a strap metal yoke of inverted substantially U-shape, the upper portion of the yoke being shaped to substantially conform to the contour of the animal's neck, the lower end portions of the yoke legs being inclined forwardly, the lower ends of the legs of said yoke terminating in forwardly and upwardly extending hooks declined laterally toward each other, a plate disposed between the lower end portions of the yoke legs, a horizontal bolt extending through the legs of the yoke, said plate being pivotally suspended from said bolt, said plate having a concave recess in the upper edge thereof to fit about the underside of the animal's neck and being provided with a transverse groove in the upper edge thereof midway between the sides of the same to expose the intermediate portion of the bolt, and a hook member pivotally suspended on said exposed portion of the bolt and extending downwardly in front of and below the plate.

2. An animal poke comprising a strap metal yoke of inverted substantially U-shape, the upper portion of the yoke being shaped to substantially conform to the contour of the animal's neck, the lower end portions of the yoke legs being inclined forwardly, the lower ends of the legs of said yoke terminating in forwardly and upwardly extending hooks declined laterally toward each other, a plate pivotally mounted between the lower end portions of the yoke legs, an arcuate pad member secured to the under side of the intermediate portion of the yoke, said pad member being of upwardly curved form in transverse section, and a Z-shaped member secured upon the yoke intermediate the ends of the pad member and having a forwardly facing flange constituting a fence wire engaging hook member.

JOHN H. BEARD.

REFERENCES CITED

The following references are of record in the file of this patent:

UNITED STATES PATENTS

| Number | Name | Date |
| --- | --- | --- |
| 395,392 | Higgins | Jan. 1, 1889 |
| 432,503 | Alford | July 22, 1890 |
| 506,603 | McWilliams | Oct. 10, 1893 |
| 591,337 | Fisher | Oct. 5, 1897 |
| 1,245,116 | McGill | Oct. 30, 1917 |
| 1,399,204 | Forsythe | Dec. 6, 1921 |
| 1,613,109 | Jackson | Jan. 4, 1927 |